United States Patent
Caruso et al.

(10) Patent No.: US 6,382,903 B1
(45) Date of Patent: May 7, 2002

(54) ROTOR BORE AND TURBINE ROTOR WHEEL/SPACER HEAT EXCHANGE FLOW CIRCUIT

(75) Inventors: Philip M. Caruso, Selkirk; Sacheverel Quentin Eldrid, Saratoga Springs; Azad A. Ladhani; Alan Richard DeMania, both of Niskayuna; Gene David Palmer; Ian David Wilson, both of Clifton Park; Lisa Shirley Rathbun, Scotia; Robert Craig Akin, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/741,906

(22) Filed: Dec. 22, 2000

Related U.S. Application Data

(63) Continuation of application No. 09/261,272, filed on Mar. 3, 1999, now abandoned.

(51) Int. Cl.[7] .............................. F01D 5/08; F01D 5/18
(52) U.S. Cl. ......................... 415/1; 415/114; 415/115; 415/116; 415/117; 416/95; 416/96 R; 416/97 R; 416/198 A; 416/201 R
(58) Field of Search ................................ 416/95, 96 R, 416/96 A, 97 R, 198 A, 200 A, 201 R; 415/114, 115, 116, 117, 1

(56) References Cited

U.S. PATENT DOCUMENTS

| 2,584,899 A | 2/1952 | McLeod ...................... 415/116 |
| 4,484,858 A | 11/1984 | Kurosaw et al. .............. 416/95 |
| 4,880,354 A | 11/1989 | Teranishi et al. ........ 416/198 A |
| 4,884,950 A | 12/1989 | Brodell et al. .......... 416/198 A |
| 5,054,996 A | 10/1991 | Carreno ....................... 415/115 |
| 5,593,274 A | 1/1997 | Carreno et al. |
| 5,704,764 A | 1/1998 | Chupp et al. .............. 416/97 R |

FOREIGN PATENT DOCUMENTS

| GB | 988541 | 4/1965 | .................. 416/95 |
| IT | 417617 | 1/1947 | ................. 415/116 |
| JP | 58-77101 | 5/1983 | .................. 416/95 |

OTHER PUBLICATIONS

"39th GE Turbine State–of–the–Art Technology Seminar", Tab 1, ""F" Technology—the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.

(List continued on next page.)

Primary Examiner—Christopher Verdier
(74) Attorney, Agent, or Firm—Nixon & Vanderhye

(57) ABSTRACT

In a turbine having closed-circuit steam-cooling passages about the rim of the rotor during steady-state operation, compressor discharge air is supplied to the rotor bore for passage radially outwardly into the wheel space cavities between the wheels and spacers. Communicating slots and channels in the spacers and wheels at circumferentially spaced positions enable egress of the compressor discharge air into the hot gas flow path. At turbine startup, cooling air flows through the closed-circuit steam passages to cool the outer rim of the rotor while compressor discharge air prewarms the wheels and spacers. At steady-state, cooling steam is supplied in the closed-circuit steam-cooling passages and compressor discharge air is supplied through the bore and into the wheel space cavities to cool the rotor.

5 Claims, 5 Drawing Sheets

OTHER PUBLICATIONS

"39th GE Turbine State–of–the–Art Technology Seminar", Tab 4, "MWS6001FA—An Advanced–Technology 70–MW C lass 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines—Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_X$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines,", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy–Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Tetzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug, 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report No. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRP15, Advanced Technology Introduction/pp. 1–6.

"Gas Steam Turbine Work as Single Unit in Ge's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al. pp. 1–4.

"General Electric's DOE/ATS H Gas Turbine Development" Advanced Turbine Systems Annual Review Meeting, Novb. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 196.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1998.

"Proceedings of the Advanced Turbine Systems Annual Program Review Meeting", vol. I, "Pratt & Whitney Thermal Barrier Coatings", Bornstein et al., p. 182–183, Oct., 1995.

"Proceedings of the Advanced Turbine Systems Annual Program Review Meeting", vol. I, "Westinhouse Thermal Barrier Coatings", Goedjen et al., p. 194–199, OCt., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, "Rayleigh/Raman/LIF Measurements in a Turbulent Lean Premixed Combustor", Nandula et al. p. 233–248, Oct., 1995.

"Proceedings of the Advanced Turbine Systems Annual Program Review Meeting", vol. II, "Lean Premixed Flames for Low $No_X$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidaka et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct, 1995.

"Proceedings of the Advanced Turbine Systems Annual Program Review Meeting", vol. II, "Combustion Chemical Vapor Deposited Coatings for Thermal Barrier Coating Systems", Hampikian et la., p. 506–515, OCt., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, OCt., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559. Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview",David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72 Nov., 1996.

"Proceedings of the Advanced Turbine Systems Annual Program Review Meeting", "Allison Advanced Simple Cycle Gas Turbine Systems", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", "Active Control of Combustion Instabilities in Low $NO_X$ Turbines", Ben T. Zin, p. 253–264, Nov., 1996.

"Proceedings of the Advanced Turbine Systems Annual Program Review Meeting", "Life Prediction of Advanced Materials for Gas Turbine Application," Sam, Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov. 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyi, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov. 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov. 1996.

"Proceedings of the Advanced Turbine Systems Annual Program Review Meeting", "Land Based Turbine Cast Initiative", Boyd A. Mueller, p 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine Systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step in H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628.

"Utility Advanced Turbine System (ATS) Technology Readiness Testing—Phase 3", Document #666274, Oct. 1, 1996–Sep. 30, 1997, Publication Dated, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30. 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1996, Publication Date, Dec. 31, 1995, Report Nos.: DOE/MC.31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercial Demonstration" Jan. 1—Mar. 31, 1996, DOE/MC/31176—5338.

"Utility Advanced Turbine System (ATS) Technology Readiness Testing Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May 1, 1999, Report Nos.: DE–FC21–95MC31176–20.

"Utility Advanced Turbine System (ATS) Technology Readiness Testing", Document #1348, Apr. 1–Jun 29, 1998, Publication Date Oct. 29, 1998, Report Nos.: DE–FC21–95MC31176—18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

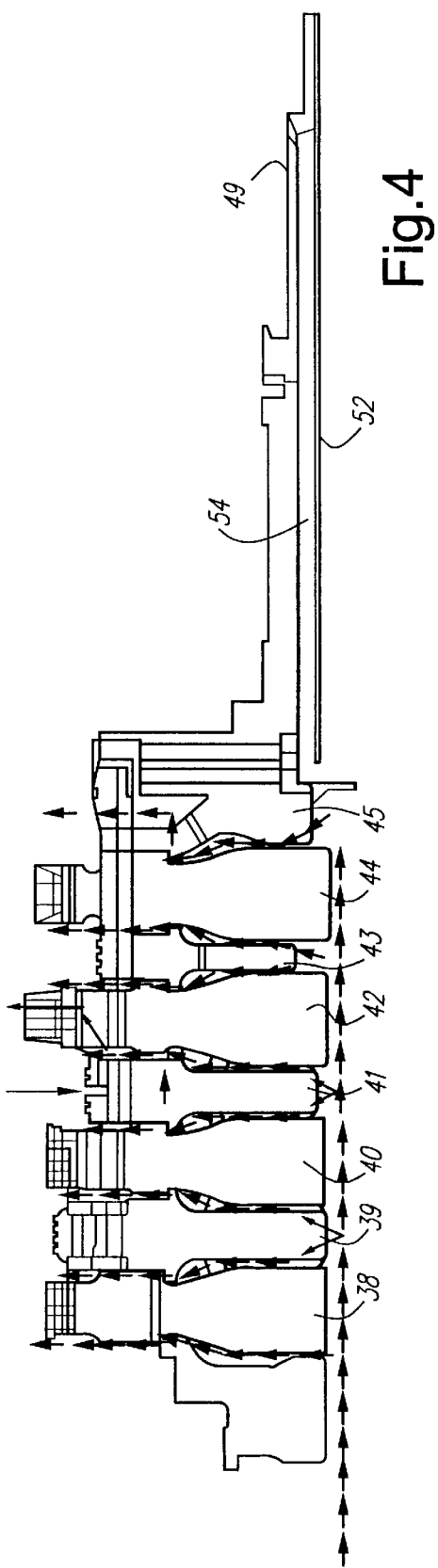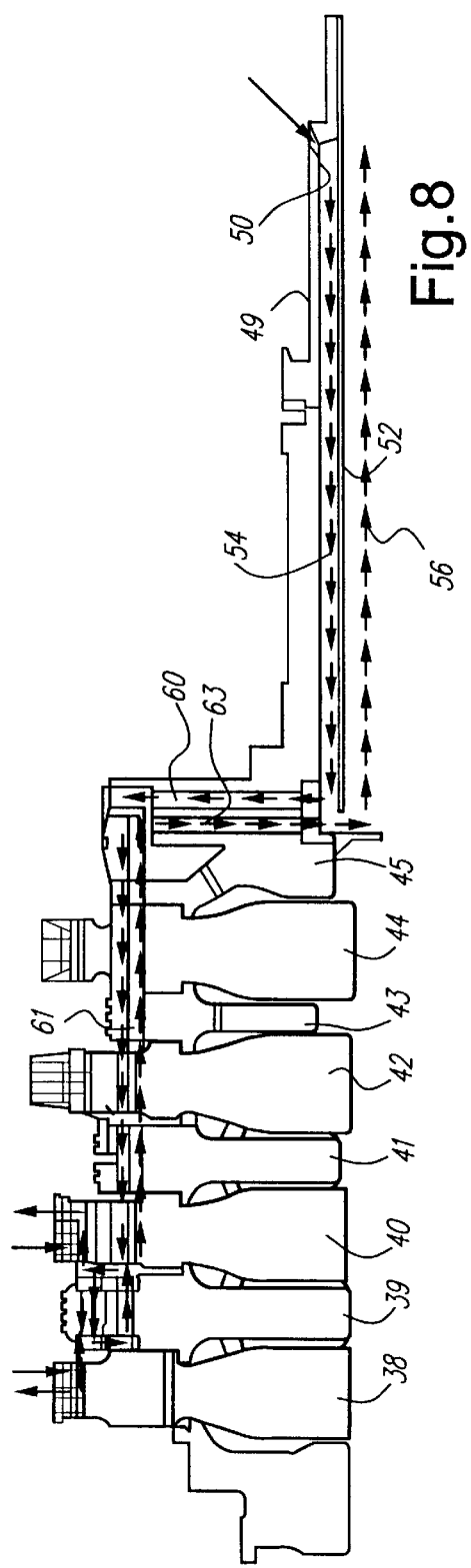

ROTOR BORE AND TURBINE ROTOR WHEEL/SPACER HEAT EXCHANGE FLOW CIRCUIT

This application is a continuation of application Ser. No. 09/261,272 Mar. 3, 1999, now abandoned, the entire content of which is hereby incorporated by reference in this application.

The Government of the United States of America has rights in this invention pursuant to COOPERATIVE AGREEMENT NO. DE-FC21-95MC31176 awarded by the U.S. Department of Energy.

TECHNICAL FIELD

The present invention relates generally to turbines, particularly to land-based gas turbines for power generation employing closed circuit steam-cooling paths for cooling the hot gas components and particularly relates to a rotor bore and turbine wheel/spacer flow circuit having a thermal medium in heat exchange relation with the wheel/spacers.

BACKGROUND OF THE INVENTION

Steam-cooling of hot gas path components, for example, the buckets of a gas turbine has been proposed in the past and found efficacious in land-based power generating plants. While gas turbines are typically air-cooled, for example, jet turbines employ compressor discharge air for cooling the hot gas components, steam-cooling is more efficient in that the losses associated with the use of steam as a coolant are not as great as the losses realized by extracting compressor bleed air for cooling purposes. Also, in combined cycle operations, steam-cooling is particularly advantageous because the heat energy imparted to the steam as it cools the gas turbine components is recovered as useful work in driving the steam turbine in the combined cycle operation.

BRIEF SUMMARY OF THE INVENTION

In a proposed gas turbine design of assignee hereof, a steam-cooling circuit is employed during normal operation to cool the hot gas path components. The steam-cooling circuit includes an aft axial bore tube assembly for supplying steam forwardly through the rotor past the aft rotor bearing. The flow continues radially outward through linear tubes, then axially along the rim of the rotor at circumferentially spaced locations. The cooling steam is also returned along the outer rim of the rotor then flowing radially inwardly and then flowing axially through the bore tube assembly. However, at startup, the steam-cooling circuit can be used as an air-cooling circuit with cooling air circulating through the steam flowpaths used during normal operation. At about 10% load, the air-cooling circuit is switched over to the steam circuit, which would then be used for normal operations.

It will be appreciated that in rotor construction, the wheels and spacers are secured to one another by a plurality of axially extending bolts. Rabbeted joints are provided between the wheels and the spacers. Differential heating of the wheels and spacers, as well as radial thermal gradients across the rabbeted joints, however, cause significant rotor bore stresses and deflections which tend to open up the rabbeted joints. It is also noted that the thermal conditions of the rotor including the wheels and spacers are different at startup, steady-state operation and turbine shutdown. Consequently, there is a need to provide a heat exchange circuit which will accommodate these different requirements at the different stages of turbine operation, accommodate these thermal gradients and preclude a wheel and spacer thermal response which would open up the rabbeted joints.

In accordance with a preferred embodiment of the present invention, there is provided a flow circuit for a thermal medium, preferably air, which may pre-warm and heat up the wheels and spacers during startup of the turbine and cool the wheels and spacers during steady-state turbine operation whereby rotor deflections are significantly controlled and the tendency of the rabbeted joints to open in response to thermal gradients is minimized or eliminated. To accomplish the foregoing, compressor discharge air is supplied to the rotor bore forwardly of the first stage for flow axially along the rotor bore and into the cavities between the wheels and spacers. At the juncture of the wheels and spacers and particularly at the rabbeted joints, channels or slots are formed in those joints at circumferentially spaced positions about the rotor to channel the thermal medium radially outwardly and ultimately for flow into the hot gas path.

It will be appreciated that during startup of the turbine, the compressor discharge air pre-warms and heats up the wheels and spacers as the flow passes radially along the axially registering faces of the wheels and spacers. By heating the wheels and spacers at startup, the thermal mismatch or gradient between the rim of the rotor and the heavy mass of the wheels and spacers radially inwardly of the rotor is diminished, thereby minimizing the stress on the rabbeted joints. During steady-state operation, however, compressor discharge air cools the wheels and spacers to reduce the thermal gradient with the outer rim and hot gas components of the rotor which are steam-cooled. Thus, during steady-state operation, rotor bore stress is likewise minimized, reducing or eliminating the tendency of the rabbeted joints to open up.

In a preferred embodiment according to the present invention, there is provided a rotor having an axis and including a plurality of turbine wheels and spacers disposed alternately between the wheels, the wheels and spacers defining cavities therebetween, the turbine wheels mounting buckets for disposition in a hot gas path of the turbine, the wheels and spacers being secured to one another and defining a passage along the axis of the rotor for receiving compressor discharge air in communication with the cavities, the wheels and spacers having axially and circumferentially extending radially confronting flanges forming a rabbeted joint therebetween, a first set of a plurality of circumferentially spaced slots carried by the wheel flanges and a second set of a plurality of circumferentially spaced slots carried by the spacer flanges, each wheel and spacer in axial confronting relation with one another being rotationally aligned to enable the flow of the compressor discharge air from the cavity through the aligned slots into the hot gas stream.

In a further preferred embodiment according to the present invention, there is provided in a gas turbine having a plurality of turbine wheels and spacers disposed alternately between the wheels, the wheels and spacers being secured one to the other to form a turbine rotor having a central axial passage, the wheels and spacers defining cavities therebetween, the wheels mounting buckets for disposition in a hot gas path of the turbine, a method of operating the turbine comprising the step of, during startup, supplying compressor discharge air along the axial passage and into the cavities between the wheels and spacers to heat the wheels and spacers.

In a still further preferred embodiment according to the present invention, there is provided in a gas turbine having a plurality of turbine wheels and spacers disposed alternately between the wheels, the wheels and spacers being secured one to the other to form a turbine rotor having a central axial passage, the wheels and spacers defining cavities therebetween, the wheels mounting buckets for disposition in a hot gas path of the turbine, a method of operating the turbine comprising the step of, during steady-state operation of the turbine, supplying compressor discharge air along the axial passage and into the cavities between the wheels and spacers to cool the wheels and spacers.

DESCRIPTION OF THE DRAWINGS

FIG. 4 is a schematic diagram illustrating a thermal medium circuit in accordance with the present invention;

FIG. 8 is a schematic representation of a closed-circuit air and steam-cooling circuit used in the gas turbine hereof.

DETAILED DESCRIPTION OF THE INVENTION

Figure 1:
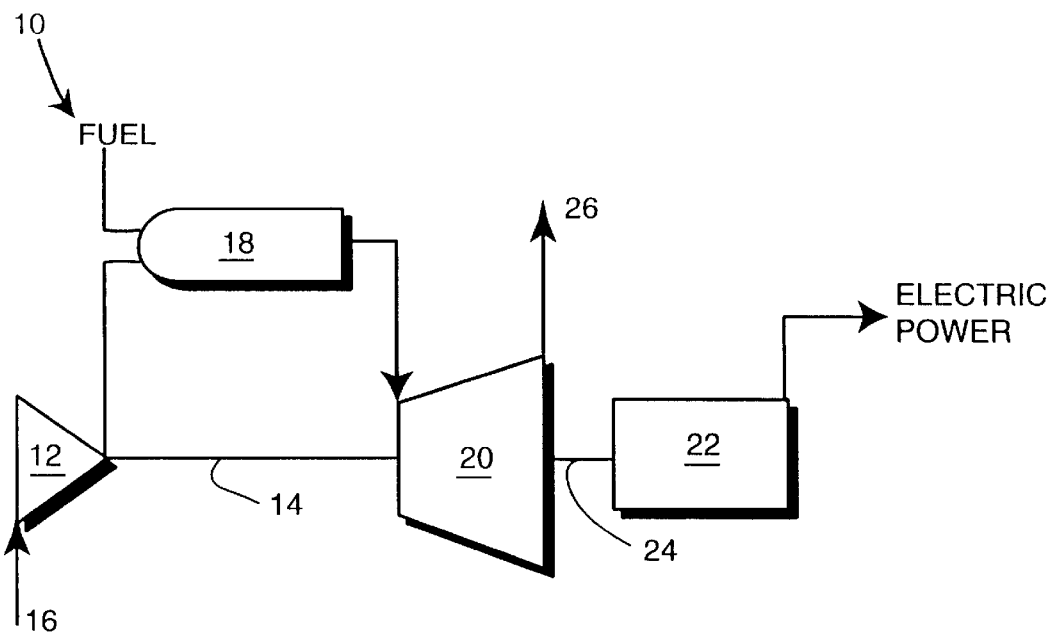
FIG. 1 is a schematic illustration of a power generation system incorporating a gas turbine with a thermal medium cooling circuit according to the present invention.

FIG. 1 is a schematic diagram of a simple cycle, single-shaft heavy-duty gas turbine 10 incorporating the present invention. The gas turbine may be considered as comprising a multi-stage axial flow compressor 12 having a rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity.

Figure 2:
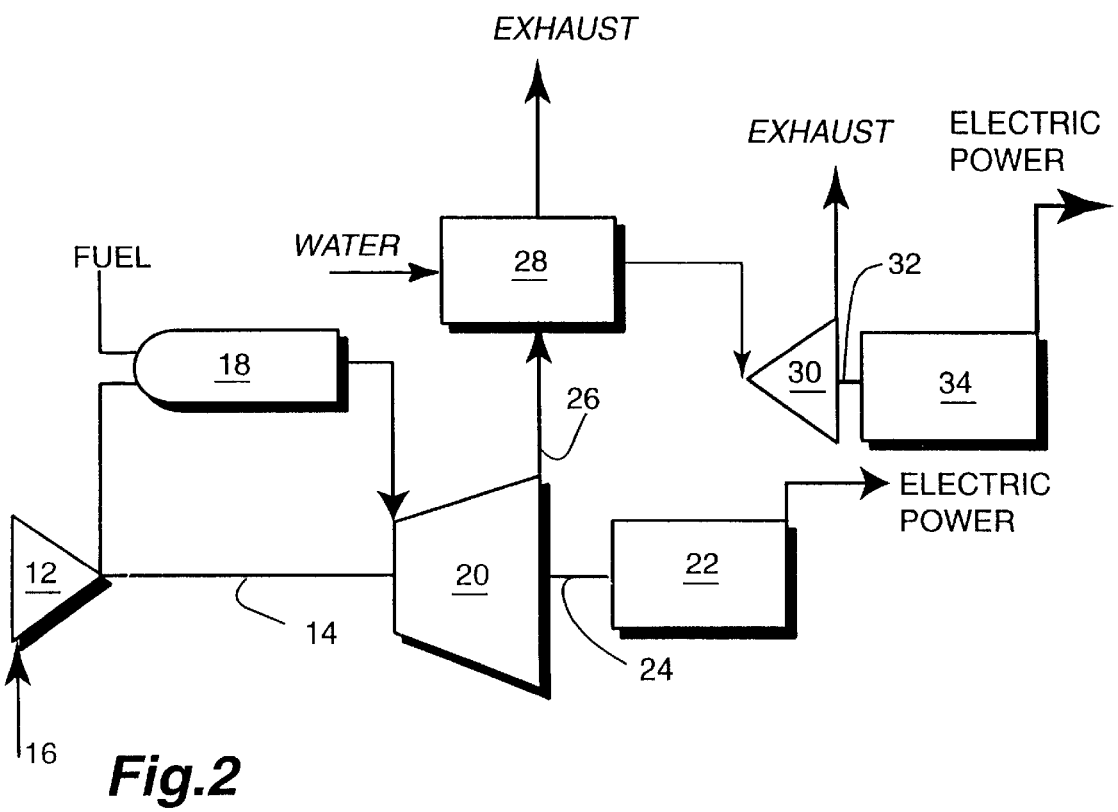
FIG. 2 is a schematic diagram of a combined cycle system incorporated in the present invention and employing the thermal medium heat exchange circuit hereof.

FIG. 2 represents a combined cycle in its simplest form, in which the exhaust gases exiting turbine 20 at 26 enter a heat recovery steam generator 28 in which water is converted to steam in the manner of a boiler. Steam thus produced drives one or more steam turbines 30 in which additional work is extracted to drive through shaft 32 an additional load such as a second generator 34 which, in turn, produces additional electric power. In some configurations, turbines 20 and 30 drive a common generator. Combined cycles producing only electrical power are generally in the 50 to 60% thermal efficiency range and using a more advanced gas turbine, of which the present heat exchange circuit forms a part, permit efficiencies in excess of 60%.

Figure 3:
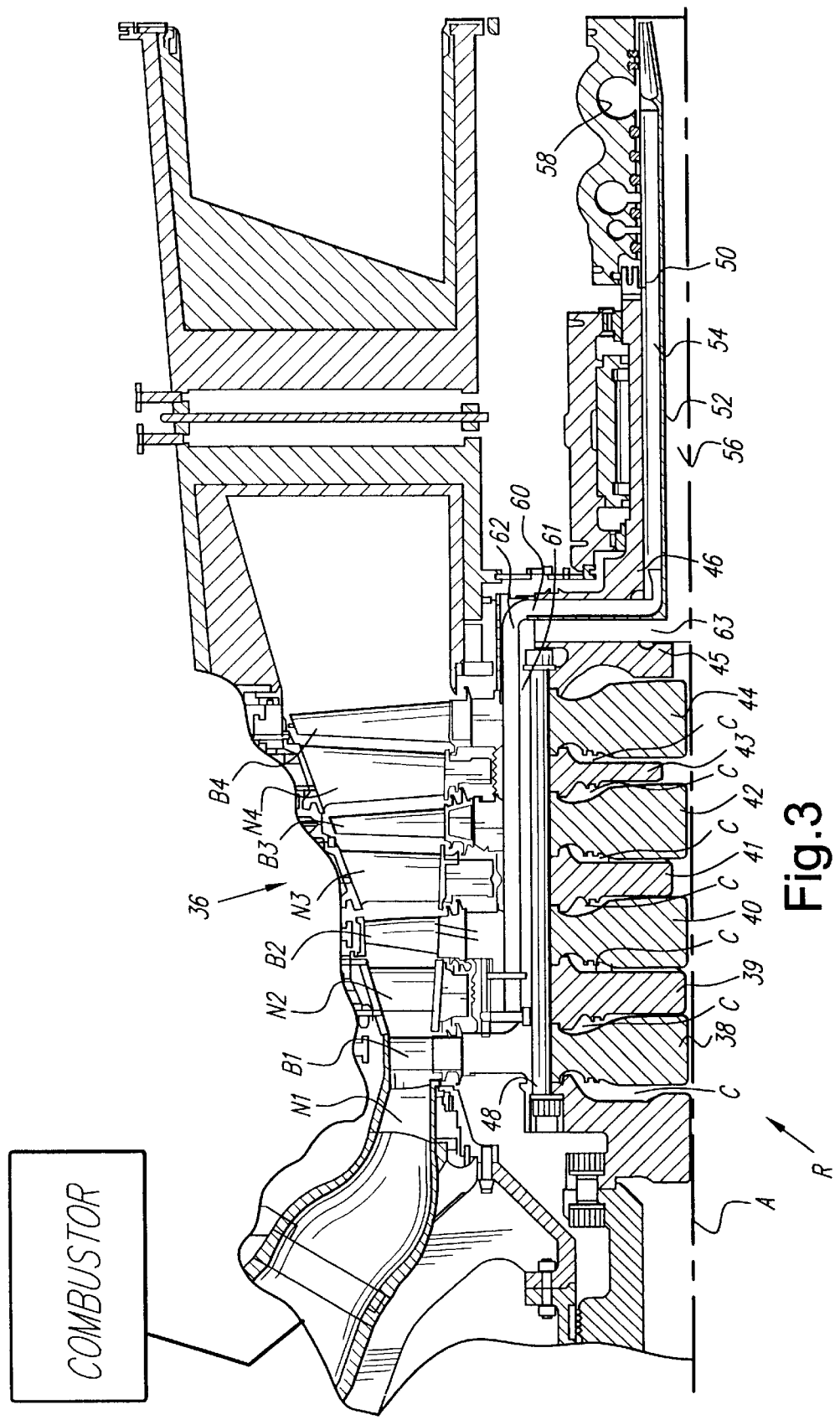
FIG. 3 is a fragmentary longitudinal cross-sectional view of a turbine section of a gas turbine illustrating the environment of the present invention.

Referring to FIG. 3, the turbine section, generally indicated 36, of the rotor shaft 24 is in part illustrated. The turbine section 36 includes a rotor, generally designated R, having a number of stages including four successive stages comprising turbine wheels 38, 40, 42 and 44 mounted to and forming part of the rotor shaft for rotation therewith, each carrying a row of buckets, buckets B1, B2, B3 and B4 being illustrated and which buckets project radially outwardly of the wheels into the hot gas path of the turbine. The buckets are arranged alternately between fixed nozzles N1, N2, N3 and N4. Alternately between the turbine wheels from forward to aft are spacers 39, 41 and 43. The aft shaft 46 includes an aft disk 45 which lies on the aft side of the last-stage turbine wheel 44. It will be appreciated that the wheels and spacers are secured to one another by a plurality of circumferentially spaced axially extending bolts 48, as is conventional in gas turbine construction.

While not per se part of the present invention and referring to FIGS. 3 and 8, there is illustrated a bore tube assembly 49 forming part of and mounted for rotation with the rotor about the rotor axis A (FIG. 3). The bore tube assembly includes outer and inner tubes 50 and 52 forming outer and inner passages 54 and 56. The outer passage 54 is connected with a plenum 58 for supplying steam to the outer passageway and radially outwardly through radial conduits 60 and axially extending conduits 62 circumferentially spaced about the rotor rim for supplying cooling steam to the hot gas components. Particularly, the cooling steam is provided to the first and second-stage buckets B1 and B2. Return or spent cooling steam flows through axially and radially extending conduits 61 and 63, respectively, for flow coaxially from the rotor bore via return passage 56. The steam-cooling circuit is illustrated diagrammatically in FIG. 8. The radial conduits 60 and 63 form part of an end cap assembly for the aft shaft 46 whereby steam flow along the rotor axis is precluded forwardly of the end cap.

Figure 6:
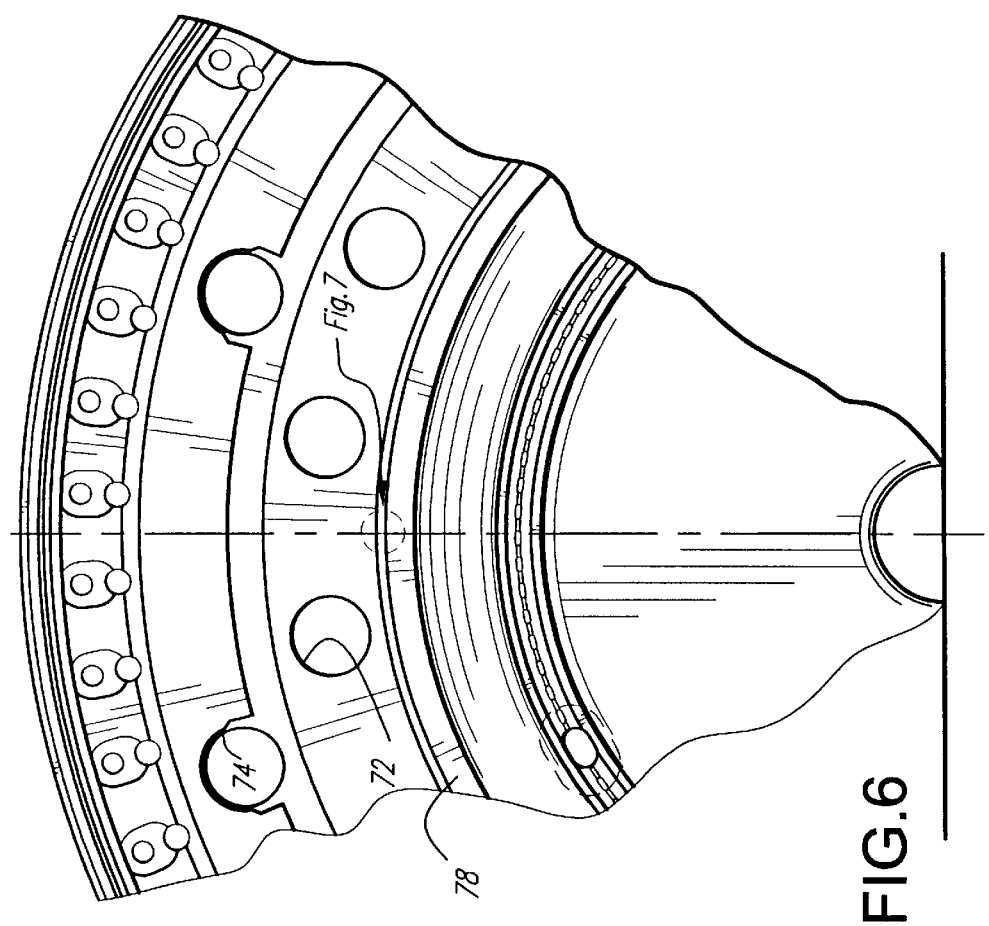
FIG. 6 is a view of the 1–2 spacer looking aft.
Figure 5:
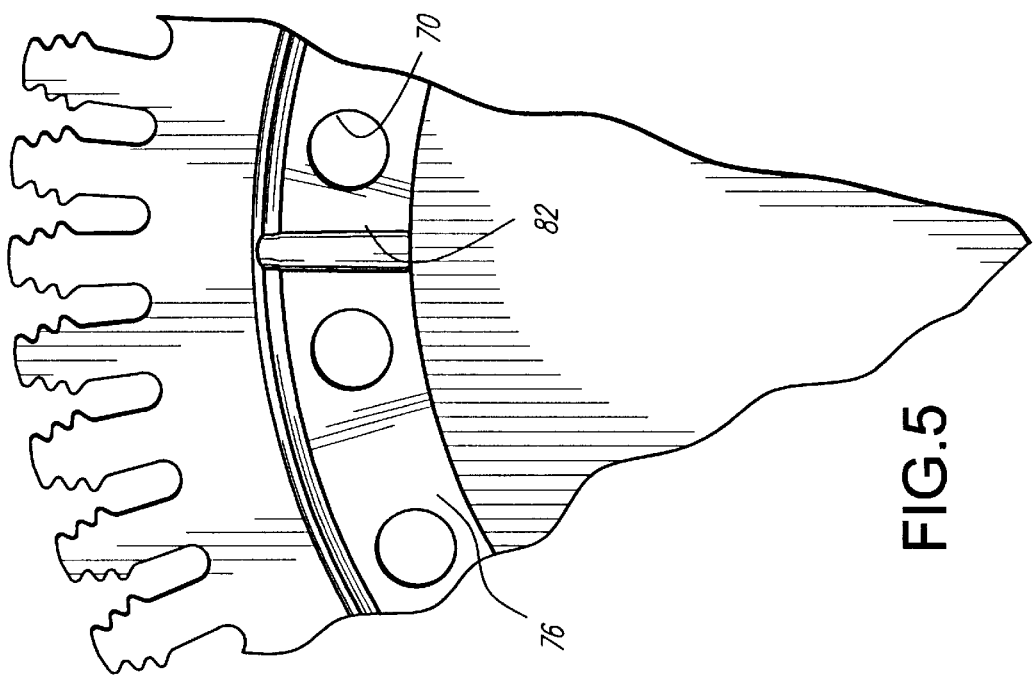
FIG. 5 is a fragmentary elevational view of a stage 1 wheel of the turbine looking forwardly.
Figure 7:
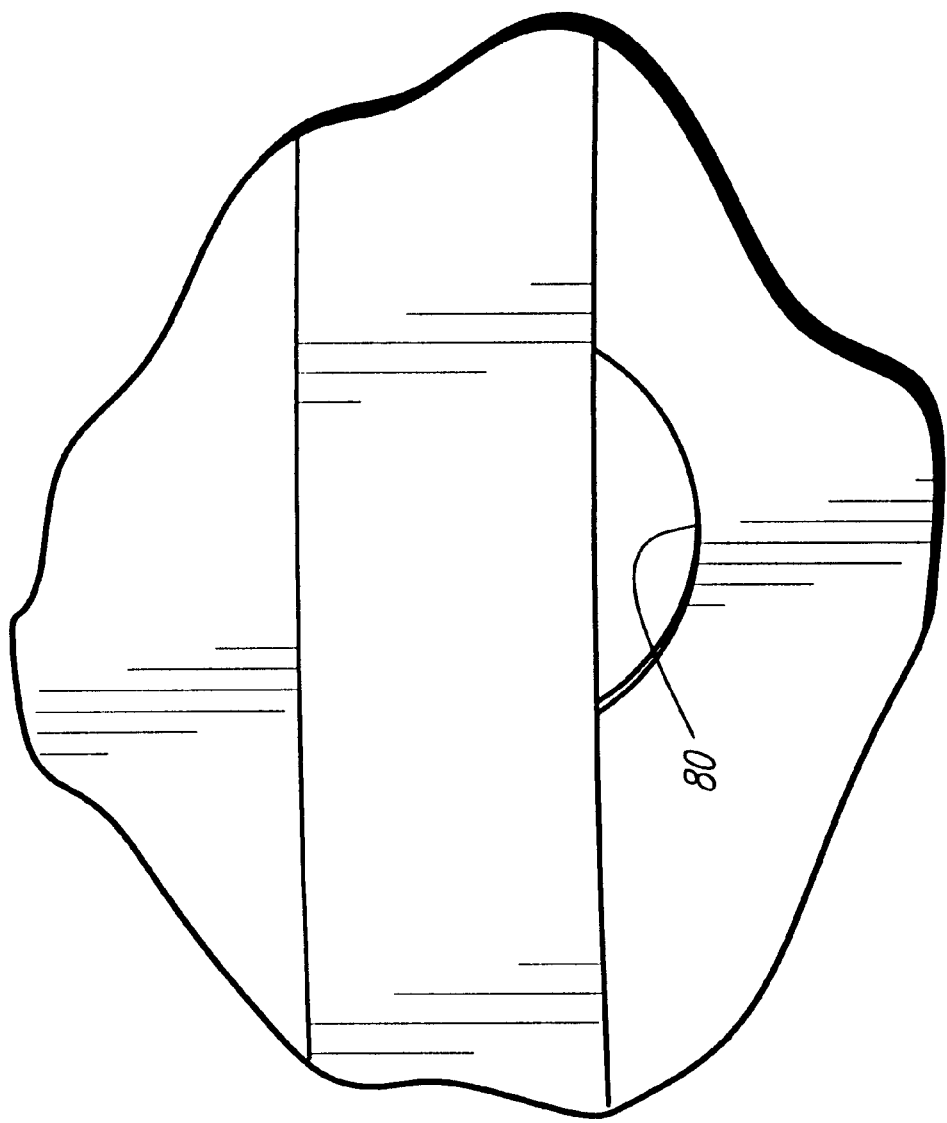
FIG. 7 is a view of the rabbeted joint illustrating a radially outwardly directed flow channel for the thermal medium hereof.

Referring now to FIGS. 5 and 6, there is illustrated in FIG. 5 the aft face of the stage 1 turbine wheel 38 and, in FIG. 6, the forward face of the 1–2 spacer 39, i.e., the spacer 39 between the first and second-stage turbine wheels 38 and 40, respectively. Circumferentially spaced openings 70 in the wheel 38 axially register with circumferentially spaced openings 72 in the spacer to receive the bolts 48 for securing the rotor in assembly. The openings 74 in the spacer 39 accommodate the circumferentially spaced axially extending steam-cooling return tubes 61, illustrated in FIGS. 3 and 8. In conventional gas turbine construction, the axial faces of the wheels have axially projecting flanges 76 in which the bolt openings 70 are formed. Each spacer has an axially projecting annular flange 78 which lies radially inwardly of the flange 76 of the axially aligned wheel and forms a rabbeted joint with the flange 76. It will be appreciated that radially inwardly of the rabbeted joint between the wheels and spacers are wheel space cavities C lying in open communication with the rotor bore forwardly of the bore tube assembly end cap.

At circumferentially spaced positions about the rabbeted joint, a channel 80 or slot is formed in the flange 78 of the spacer, the channel being directed axially. Additionally, a slot 82 is formed in a radial outward direction through the flange 76 of the wheel. The spacers and wheels are clocked relative to one another such that the channel 80 and the slot 82 are radially aligned, forming a through-passage between the wheel space cavity and radially outwardly of the rabbeted joint. The channels 80 form metering slots for the flow of the thermal medium in a radial outward direction.

Compressor discharge air is supplied to the bore of the rotor assembly forwardly of the first stage. The compressor discharge air as illustrated by the arrows in FIG. 4 passes radially outwardly into the wheel space cavities between the wheels and spacers in heat exchange relation with the wheels and spacers. The air from the cavities passes through the aligned channel and slot 80 and 82, respectively, and ultimately into the hot gas path.

At startup, the turbine is supplied with cooling air through the closed-circuit steam-cooling passages illustrated in FIG. 8. It will be appreciated that at startup, the hot gases of combustion flow through the hot gas path, heating up the outer rim of the rotor, causing a thermal gradient radially inwardly of the hot gas path which causes bore stresses and, unless accommodated, could cause deflection of rotor parts disadvantageously affecting the flanges and rabbeted joints. These bore stresses tend to open or distort the rabbeted joints between the wheels and spacers. To minimize or eliminate those bore stresses, compressor discharge air flows from the compressor into the rotor bore and radially outwardly into the wheel space cavities. The compressor discharge air is, at startup, at a temperature higher than the temperature of the wheels and spacers, thus pre-warming and pre-heating the wheels and spacers. Additionally, the pre-heating of the wheels and spacers reduces the thermal gradient radially along the rotor and controls wheel and spacer deflections, reducing the tendency of the rabbeted joints to open or distort. As the rotor continues its startup, the air in the closed-circuit steam-cooling circuit is replaced by steam and the outer rim and certain hot gas path components of the rotor are cooled by flowing steam through the closed circuit (see FIG. 8). As the rotor continues to heat up, the rotor will obtain a temperature higher than the compressor discharge air. At that time, the compressor discharge air tends to cool the wheels and spacers during steady-state operations. With the outer rim of the rotor being steam-cooled and the interior portions of the wheels and spacers likewise being cooled, the radial thermal gradient is reduced, thereby minimizing or eliminating bore stresses and maintaining the rabbeted joints between the wheels and spacers closed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:

a rotor having an axis and including a plurality of turbine wheels and spacers disposed alternately between the wheels, said wheels and spacers defining cavities therebetween, said turbine wheels mounting buckets for disposition in a hot gas path of the turbine, said wheels and spacers being secured to one another and defining a passage along the axis of the rotor for receiving compressor discharge air in communication with said cavities, said wheels and spacers having axially and circumferentially extending radially confronting flanges forming a rabbeted joint therebetween;

a first set of a plurality of circumferentially spaced slots carried by said wheel flanges and a second set of a plurality of circumferentially spaced slots carried by said spacer flanges, each said wheel and said spacer in axial confronting relation with one another being rotationally aligned to enable the flow of the compressor discharge air from said cavities through said aligned slots into said hot gas stream; and closed circuit cooling steam passages along a rim of the rotor and into said buckets for steam cooling the buckets.

2. In a gas turbine having a plurality of turbine wheels and spacers disposed alternately between the wheels, said wheels and spacers being secured one to the other to form a turbine rotor having a central axial passage, said wheels and spacers defining cavities therebetween, the wheels mounting buckets for disposition in a hot gas path of the turbine, a method of operating the turbine comprising the step of, during startup, supplying compressor discharge air along said axial passage and into said cavities between the wheels and spacers to heat the wheels and spacers, supplying cooling steam along said rotor and into said buckets for cooling the buckets during steady state operation, and supplying compressed discharge air along said axial passage and into said cavities to cool the rotor during steady state operation.

3. A method according to claim 2 including flowing the compressor discharge air from the cavities into the hot gas path.

4. A method according to claim 2 including forming rabbeted joints between the wheels and spacers defining the radial outermost extent of said cavities and providing metering passages through said rabbeted joints at circumferentially spaced positions about the joints for flowing the compressor discharge air from the cavities into the hot gas path.

5. A method according to claim 2 including providing closed circuit steam cooling passages along a rim of the rotor and in communication with interior portions of said buckets for flowing cooling steam to said buckets during steady state operation, and during start-up, supplying cooling air along said steam cooling passages to cool the buckets during start-up.

* * * * *